Oct. 25, 1966  R. E. RAHAUSER  3,280,722
DEEP FAT PRESSURE FRYER FOR FOOD
Filed March 3, 1965  3 Sheets-Sheet 1

INVENTOR.
ROBERT E. RAHAUSER
BY
ATTORNEY

Oct. 25, 1966  R. E. RAHAUSER  3,280,722
DEEP FAT PRESSURE FRYER FOR FOOD
Filed March 3, 1965  3 Sheets-Sheet 2
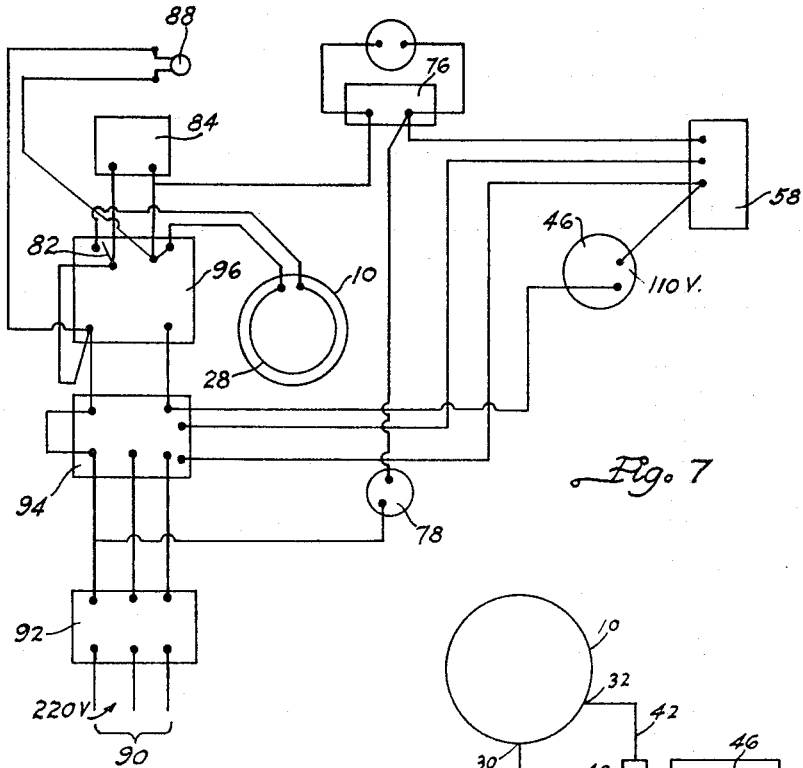
Fig. 7
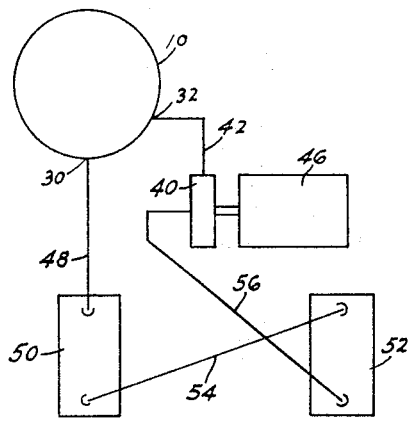
Fig. 8
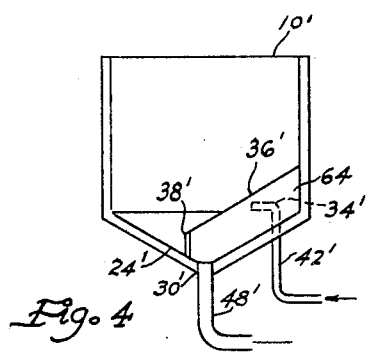
Fig. 4  Fig. 5
INVENTOR.
ROBERT E. RAHAUSER
BY
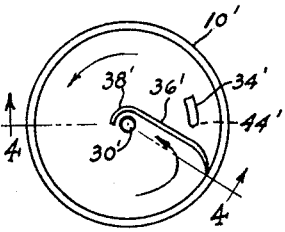
ATTORNEY Oct. 25, 1966  R. E. RAHAUSER  3,280,722
DEEP FAT PRESSURE FRYER FOR FOOD
Filed March 3, 1965  3 Sheets-Sheet 3
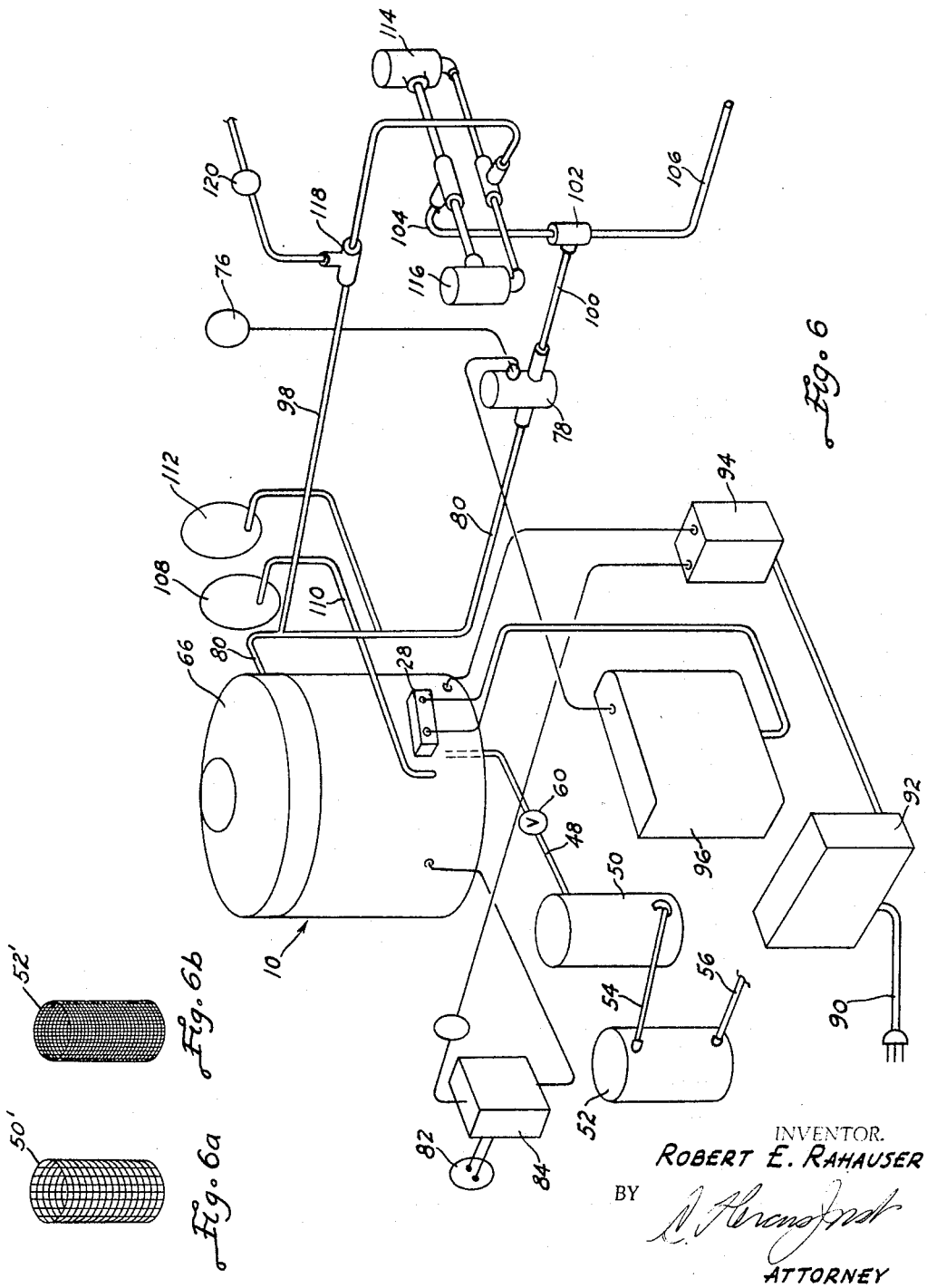
INVENTOR.
ROBERT E. RAHAUSER
BY
ATTORNEY

United States Patent Office 3,280,722
Patented Oct. 25, 1966

3,280,722
DEEP FAT PRESSURE FRYER FOR FOOD
Robert E. Rahauser, 1131 Locust Grove Road,
York, Pa.
Filed Mar. 3, 1965, Ser. No. 436,740
10 Claims. (Cl. 99—332)

This invention pertains to a deep fat pressure fryer for food of either the vegetable or meat type. Fryers of this type include a container somewhat resembling a large kettle open at the top and capable of being sealed by a suitable cover, whereby a substantial quantity of cooking oil, fat, or the like, is rendered liquid when heated. In a very short period of time, after heating of the cooking oil is commenced, a pressure rapidly is generated which aids in the thorough penetration of food stuffs with the cooking oil at elevated temperatures for purposes of rapidly and thoroughly cooking the food.

Basically, the essential components of apparatus of the type described above have been used for at least a limited number of years and are relatively popular today for cooking such foods as chicken, other types of meats, vegetables, soups, sea food such as clams and crabs, and otherwise. When cooking chicken and certain other types of foods, it is quite common to apply a covering thereto of flour, cracker crumbs, corn meal or the like, to produce what is known as a breaded product, or otherwise, to form a tasty and enjoyable brown crust upon the product such as results when cooking chicken in a fryer of this type. As a result, however, during the cooking operation of this type of product, certain particles either of the food per se or the applied coating of flour, cracker crumbs, or the like, tend to fall from the food or otherwise become separated therefrom, somewhat resembling droppings. If permitted to remain in the cooking oil indefinitely, droppings of this type continue to be cooked harder and harder and tend to discolor the cooking oil and also affect the flavor thereof. Further, any substantial quantity of such material substantially tends to clog drains for the fryer when draining of the cooking oil therefrom occurs.

It is the principal object of the present invention to provide a deep fat pressure fryer for various types of foods in which the container is provided with distribution means for the cooking oil or fat so as to induce, at least periodically, a circulation of the heated cooking oil or fat between an inlet port and a discharge port in a manner to effectively remove droppings of the type referred to from the interior of the cooking container, and filter means are provided to separate such removed droppings from the cooking oils and thereby maintain the cooling oils substantially clear and free of such material, said operation preferably being performed automatically.

Another object of the invention is to induce such removal of the separated food particles or droppings from the cooking oil by means of appropriate baffle mechanism tending to induce the effective swirling of the cooking oil, at least periodically, and thus insure a flushing of the separated particles and droppings from the container for transfer from the container to the filter means referred to above and thereby insure separation of such particles and droppings from the cooking oil after assured progressive and periodic removal thereof from the container.

A further object of the invention is to provide a series of filter means respectively of different straining capacities, these filter means preferably being in series and the coarser one arranged nearest the discharge port of the cooking container, while the finer filter means is downstream from the coarser filter means, said filter means both being disposed in a conduit between the discharge port of the cooking container and the pump which assures circulation of the cooking oil during the cycling thereof while being circulated as aforesaid.

Still another object of the invention is to provide pressure regulating means preferably in the form of a solenoid-actuated valve positioned in a pressure discharge line from the upper portion of the cooking container, said valve also preferably being in circuit with a timer by which the heating period for the cooking container is regulated, said solenoid-actuated valve being responsive to minimum predetermined pressure within the container to open the interior of the container to atmosphere as when a cooking cycle has been completed and the circuit of said solenoid-actuated valve being connected in the same circuit as said timer to assure closing of the valve when the timer initially is set to establish a cooking period of a predetermined amount of time in accordance with the setting of the timer.

A still further object of the invention is to provide an appropriate manually operable safety valve and automatically operable relief-type safety-valves in the conduit between the cooking container and the solenoid-operated valve to permit rapid discharge to pressure from the container to atmosphere or otherwise if desired, as to prevent pressure to increase within the container to a dangerous limit in the event of a malfunction of any of the normally operable pressure relief mechanisms.

Still another object of the invention is to provide a preferably manually operable valve in the discharge conduit between the discharge port and the coarser of the two filters, said filters preferably being of the type including a renewable or removable cartridge and, upon closing of said valve, the pump may be operated to drain the filter containers of cooking oil and thereby facilitate the removal or renewal of the cartridges therefrom.

Details of the foregoing objects and of the invention, as well as other objects thereof, are set forth in the following specification and illustrated in the accompanying drawings, comprising a part thereof.

In the drawings:

FIG. 4 is a fragmentary vertical sectional view illustrating a different embodiment of cooking container from the embodiment shown in FIGS. 2 and 3, substantially as seen on the line 4—4 of FIG. 5, and illustrating only fragmentary portions of the circulating mechanism associated with the container.

FIG. 5 is a plan view of the embodiment of cooking container shown in FIG. 4.

FIG. 6 is a perspective schematic arrangement of the various tube-like conduits 4 circulating cooking oils and the like as well as the electric circuitry which energizes the heater of the cooking container and the various control means which regulate the circulation of the cooking oils and pressures generated within the container.

Figures 1, 2, 3:
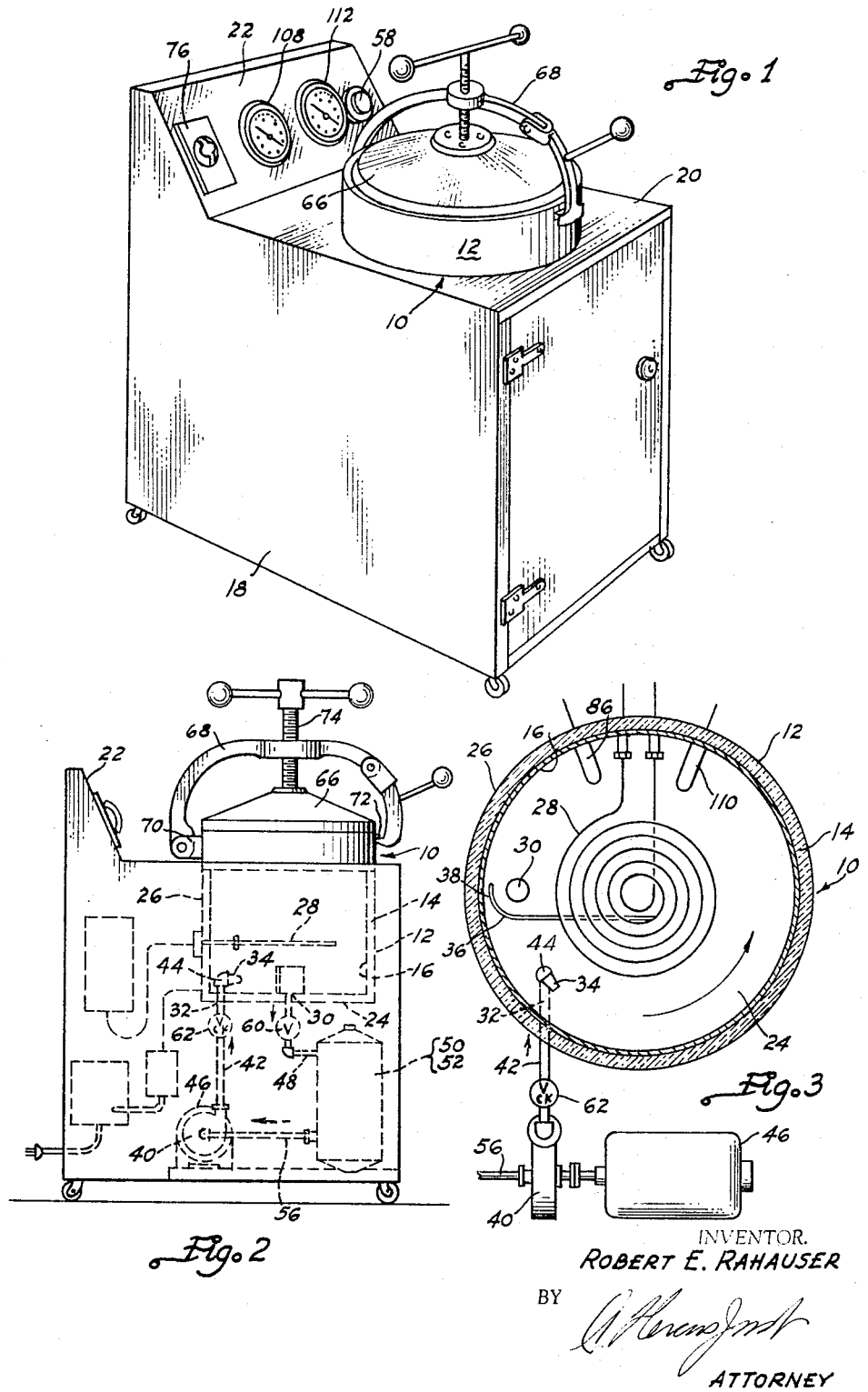
FIG. 1 is a perspective view of an exemplary cabinet within which the cooking container embodying the principles of the present invention is mounted to present an aesthetic appearance and include all of the operating apparatus in a compact assembly.
FIG. 2 is a side elevation of the cabinet shown in FIG. 1 and illustrating in phantom certain details of the mechanism contained within the cabinet.
FIG. 3 is a fragmentary plan view showing the cooking container and the circulating means for the cooking oil which is associated with said container.

FIGS. 6a and 6b respectively are exemplary perspective illustrations of relatively coarse and fine filter cartridges of the type used in the filter units of the system.

FIG. 7 is a wiring diagram of the electric circuitry otherwise illustrated schematically in FIG. 6.

FIG. 8 is a diagram of the fluid conduits which circulate the cooking oils between the various elements of the system otherwise shown in FIG. 6 schematically.

The principal single item of the present invention comprises the cooking container 10 which, in its preferred construction, is cast from suitable material such as stainless steel, aluminum, or the like. If desired, the container, which is generally in the shape of a kettle, may be fabricated from sheet material of suitable thickness and welded, the material, for example, being either stainless steel, aluminum, or sheet steel suitably finished such as by a coating of appropriate ceramic material to render the same readily capable of sustaining relatively high temperatures within ranges appropriate to suitably cook, by deep frying, meats such as chicken or other forms of poultry, meats other than poultry, fiish and other forms of sea food, vegetables, soups, and the like, some of which require atmospheres or cooking mediums other than cooking oils or shortening.

For purposes of economy in heat required by the cooking container, said container preferably has an outer shell 12 of suitable decorative finish such as brushed aluminum or stainless steel, a layer of suitable insulation 14 on the interior thereof, and an inner cooking vessel, kettle, or container 16, all of which are assembled as a unitary, composite structure generally referred to as hereinafter and in the claims as a cooking container.

The cooking container also preferably is supported within an enclosed by an appropriate, attractive outer cabinet 18 having a top 20 through which the cooking container 10 extends, the upper edge thereof preferably being readily accessible above the top 20. An instrument panel 22 upon which appropriate switches, pressure gauge dials, and the like are mounted, details of which are described hereinafter is supported rearward of top 20.

The composite cooking container 10 also is provided with an appropriate bottom 24 which is integral with the side walls 26 which, preferably, are cylindrical. In the embodiment specifically illustrated in FIG. 2, it will be seen that the bottom 24 is substantially flat and horizontal and a heating coil 28, preferably of the electrical resistance type, such as a "Calrod" heating unit, is mounted within the cooking container 10 preferably in slightly spaced relationship to the bottom 24.

In the majority of cooking operations contemplated for the container 10, and especially for deep frying operations, an appropriate cooking oil or other similar form of shortening, grease, or the like is employed in substantial amount, especially in commercial operations such as restaurants, drive-in restaurants, seashore food counters, and the like, all of which are popular at the present time. The products sold by certain of these establishments are merchandised under certain trade names tending to simulate a combination of broiling, roasting, frying, etc. Actually, such products, if initially of a moist nature, generate a certain amount of steam while being subjected to deep frying in a hot cooking oil for example, whereby a combination type of processing can be undertaken in certain types of machines presently available. The deep fat pressure fryer comprising the present invention however, primary is the type which only provides for the utilization of cooking media which is supplied to and withdrawn from the cooking container by means to be described and pressure may be generated by the heating of such cooking media within said cooking container.

The delivery of the cooking media, which will be referred to generically hereinafter as cooking oil, is delivered to, circulated within and withdrawn from the cooking container by means of the following mechanism. In the embodiment shown in FIGS. 2 and 3, the bottom 24 of the container 10 is provided with a discharge port 30 preferably adjacent the periphery of the bottom. The cooking oil is delivered to the interior of the container 10 preferably adjacent the bottom 24 thereof by means of a nozzle 34 connected closely to the inlet port 32.

As will best be seen from FIG. 3, the nozzle 34 is disposed closely adjacent the side walls of the container 10 and is directed tangentially with respect thereto to discharge cooking oil which is delivered to the nozzle by pressure means, to be described. Discharge of the cooking oil from said nozzle in a tangential manner, induces a swirling movement of the oil as well as entrained particles of breadings, small meat particles and the like which separate from the food being cooked within the oil while usually suspended in a wire mesh basket or the like, carrying the cooking oil and such entrained droppings spirally toward the discharge port 30. To insure the passage of such droppings through the drain, one of the principal contributions offered by the present invention to the cooking equipment of the type referred to comprises a baffle 36 which extends substantially radially approximately from the center of the container 10, supported by the bottom 24 and preferably affixed thereto, and terminating in a curved terminal end 38. The baffle is preferably at least several inches in height and inasmuch as the small particles or droppings which fall from the food being processed are heavier than the cooking oil and settle toward the bottom of the container, the baffle 36 will intersect such droppings and similar material in its swirling movement induced by the tangentially directed nozzle 34, thereby preventing any further substantial movement of the droppings in the vicinity of the discharge port 30. A suction action also is induced, by means to be described, at the discharge port 30, thereby facilitating the carrying of the suspended droppings through the discharge port 30 and thereby remove the same from the container 10.

Circulation of the cooking oil within the container 10 is performed by an appropriate pump 40. The pump, as well as several filter means to be described, are interconnected by a conduit system. The particular tubing or conduits employed may be of the nature of conventional pipe, rigid or flexible tubing, or the like, as found most appropriate. A conduit 42, comprising part of the conduit system, extends between the delivery end of pump 40 and the inlet port 32 from which a nipple 44 extends for connection with the tangentially arranged discharge nozzle 34. The pump 40 preferably is driven by an electric motor 46 of suitable horsepower and speed.

The discharge port 30 is connected to a conduit 48 which leads to a pair of filters 50 and 52 which are of different capacities. Filter 50 is the first one to receive the cooking oil with entrained droppings, etc. thereon Both of the filters preferably are of the type which have removable and renewable cartridge members, separable from the filter shell preferably as a unit so as to minimize mess and inconvenience. One form of cartridge which has been found to be highly efficient is made from coiled wire mesh of suitable range of opening sizes. In filter 50, which is designated as the coarse filter, the mesh size of the coiled filter member 50' shown in FIG. 6a in exemplary manner, may be of the order of between 25 mesh and 30 mesh, for example, but without restriction thereto. The function of this filter is primarily to remove the coarser particles of entrained material from the cooking oil.

The outlet end of filter 50 is connected by conduit 54, see FIG. 6, to the inlet end of the second filter 52 which is designated as a finer filter in that the mesh size of the filter cartridge 52' therein, shown in FIG. 6b in exemplary manner, is very substantially smaller than that in filter 50 for purposes of removing substantially all of the remaining entrained particles of extraneous material such as droppings and tiny pieces of food from the cooking oil. Accordingly, as the filtered cooking oil is discharged from filter 52, through conduit 56, to pump 40, it is substantially free of all foreign material capable of being removed therefrom by filter means. The filter cartridges are of the type which may be discarded at the end of each using when they become entrained with retained particles until they are substantially saturated, or, especially if the filter cartridges are made from wire mesh of the nature of stainless steel or the like and the cost thereof is substantial, they may be of the type which can be cleaned and otherwise renewed for reuse. Filter 52 may, without restriction thereto, be about 80 mesh.

In the preferred operation of the fryer and the control system thereof comprising the present invention, the pump 40 is not operated continuously during the operation of the fryer. Rather, the pump and pump motor 46 are operated periodically for a few minutes duration each, as controlled by a preferably electrically operated timer 58 shown best in the diagram of FIG. 7. Said timer preferably is adjustable and has an appropriate control knob thereon as shown in exemplary manner in FIG. 1. Such periodic circulation of the cooking oil for filtering purposes does not unduly disturb the cooking operation when food is being processed during such periods of circulation of the cooking oil, thereby conserving heat.

The discharge conduit 48 which leads from the discharge port 30 to the filter 50, also preferably includes a manually operable valve 60 which, when it is desired to service the filters 50 and 52, may be closed, following which the controls for motor 46 may be suitably manipulated to commence operation of the pump 40 and thereby pump the cooking oil from the containers of the filters 50 and 52 into the cooking container 10 while discharge therefrom is shut off by valve 60, whereupon the filter cartridges within the filter unit may substantially be reasonably drained of the cooking oil and thereby facilitate the removal and servicing of the cartridges with a minimum of mess and waste of cooking oil. Upon restoring of the cartridge units to operative condition, the manual valve 60 then is opened for normal circulation of the cooking oil from the cooking container 10, through the filters, and back to the container.

In the event it may not be found most desirable for cooking certain quantities of foods and/or maintain the cooking container 10 reasonably filled with cooking oil, whereby the level of the cooking oil may be substantially below the top of the container 10, or if for any other reason, it is desired to have the discharge nozzle 34 within the body of the cooking oil, it then is preferred that a one-way check valve 62 be mounted within conduit 42 so as to control the flow of cooking oil only from the pump to the discharge nozzle 34 and not reversely.

A second embodiment of shape of cooking container is illustrated in FIGS. 4 and 5, this embodiment primarily differing with respect to the shape of the bottom of the container. In these figures, it will be seen that the cooking container 10' preferably has a cylindrical side wall and is of composite nature as in regard to container 10 of the embodiment shown in FIGS. 2 and 3. However, the bottom 24', rather than being substantially flat and horizontal, is conical, the apex extending downwardly. Also, the discharge port 30' is formed preferably directly centrally of the apex and discharge conduit 48' is connected thereto for delivery to the filtering mechanism of the same type shown in the embodiment of FIGS. 2 and 3. Similarly, the cooking oil is delivered to the container 10' by an inlet conduit 42', leading from the pump of the type shown in the preceding embodiment and discharging through a preferably tangentially arranged discharge nozzle 34' positioned adjacent the bottom 24' so as to swirlingly sweep the bottom with incoming cooking oil.

The baffle of the embodiment shown in FIGS. 4 and 5 however is somewhat differently arranged from the baffle 36 of the embodiment of FIGS. 2 and 3. Referring to FIGS. 4 and 5, it will be seen that baffle 36', while extending substantially radially inward from the side walls of the container 10, preferably has a curved outermost end 64 which preferably adjoins the interior of the container 10'. The opposite end 38' of baffle 36' also is curved, extending at least partially around the vertical axis of the discharge port 30'. Hence, as the cooking oil is pumped and discharged tangentially from the nozzle 34' in a swirling manner, it will move in the direction of the arrow shown in FIG. 5 with the result that the entrained particles to be removed from the cooking oil, will contact the baffle 36' as said particles settle toward the bottom of the container 10' and be assured of being flushed through the discharge port 30' for entrapment by the filter units to which the cooking oil and entrained material is subjected as the same leaves the discharge port 30'.

During the cooking operations in the preferred manner, the open upper end of the container 10 is closed by a cover 66 which may be cast or otherwise suitably formed from material similar to that from which the cooking container 10 and especially the inner cooking container 16 is formed. Aluminum and stainless steel are highly suitable for this purpose. The cover 66, adjacent the periphery, is provided with a suitable gasket, not shown, to effect complete sealing between the cover and upper end of the container 10 when in operation. Such sealing and clamping of the cover relative to the container is achieved in suitable locking bail 68 appropriately pivotally connected at one end to a clevis 70 and at the other end having a hook engaging suitable detent 72. A clamping screw 74 is tightened against the upper end of cover 66 when the locking bail 68 is mounted in operative position, thus completing the sealing of the cover 66 relative to container 10.

After the introduction into the container 10 of the desired amount of cooking oil and especially after the filters 50 and 52 have become saturated therewith so as not to effect the level of the cooking oil within the container, and assuming that the batch of food to be cooked by deep frying has been introduced into the container within the suitable wire basket or other appropriate means, an operating timer 76 is actuated to accomplish several things. The first of these is to energize the solenoid of solenoid-actuated valve 78 located in pressure line 80 leading from the upper part of cooking container 10. The timer 76 also is set for a predetermined period comprising the cooking time.

By referring to FIG. 6, it will be seen that the electrical circuit also comprises a master switch 82 which is manually operated. When said switch is closed, the entire operation of the cooker commences. Upon closing said master switch, the circuit is completed to the heating element 28 within cooking container 10, preferably in the lower portion thereof, and said coil remains energized in accordance with further control provided by a thermostatically operated switch 84, the pilot tube 86 of which extends into the container 10 as shown in FIG. 3. The thermostatic switch 84 preferably is of the adjustable type and operates within relatively close temperature limits to maintain the temperature of the cooking oil within container 10 reasonably constant. Also, a conventional pilot light 88 is included in the circuit of the master switch 82 to indicate when the heater is ON. To furnish current to the various electrical means of the system which controls the operation of the cooking within the container 10, an electrical conduit 90 is connected to a suitable source of current, such as 220 v. capacity, such current being led to a junction box 92 from which a circuit leads to an appropriate circuit breaker 94. The various principal control switches also are located in a control box 96 appropriately mounted within the cabinet 18, in compact arrangement with the various filters and other control and operating mechanism, relief valves, and the like.

Referring to FIG. 7, it will be seen that the pump timer 58 is suitably connected in the circuit to operate the motor 46 cyclically. For convenience and practicality, in accordance with normal operation of the cooking container comprising the invention, the timer 58 may be of the type which operates on a ten minute cycle, though this is not to be regarded as restrictive. The timer also is operable to control the length of time the motor and pump operate during each ten minute cycle. For example, it may be desired to operate the pump three minutes during each ten minute interval, whereby the pump sequentially will be idle seven minutes in each cycle. The cycle obviously may be varied as desired or required in accordance with the setting of the adjustable timer 58.

Referring particularly to FIG. 6, and the pressure line circuitry illustrated therein, it will be seen that a pressure discharge conduit 80 communicates with the upper end of cooking container 10 and leads for there to the solenoid valve 78. A branch pressure line 98 also extends from the pressure line 80 for purposes to be described. The solenoid valve 78 also communicates with other pressure line 100 which enters a branching T 102 for directing pressure to a short conduit 104, for purposes to be described and also to another conduit 106 leading to atmosphere or, alternatively, to an appropriate condenser, if desired.

As has been described above, when a cooking cycle is to be instituted, following the loading of the cooking container with a basket full or otherwise of food to be cooked by deep frying, or the like, and after the cover 66 has been locked in sealing engagement with the upper end of the container 10, the timer 76 is operated initially to close the solenoid valve 78 which seals the interior of the container 10 from contact with atmosphere. The timer 76 also sets the period for which the valve 78 is to remain closed. At the completion of the cooking cycle for which the timer 76 has been set, the valve 78 automatically is opened to release the increased pressure within the container 10 to atmosphere as rapidly as possible, or to a suitable condenser, as referred to above, prior to opening the container 10 to remove the cooked food. In order that operating conditions within the container 10 may be observed at all times, a temperature dial 108 is mounted upon the instrument panel 22 and suitable temperature conducting means 110 extend therefrom into the interior of container 10 to record the temperature of the cooking oil at all times. Also, a pressure indicating valve 112 is connected into pressure line 80 so as to be responsive to the pressure within the interior of cooking container 10 at all times.

Appropriate safety means, with regard to the pressure on the interior of cooking container 10, are provided to insure that excessive pressure will not be generated in an unsafe manner within the container. Said safety means comprise preferably at least two safety relief valves 114 and 116, in the nature of pop-off valves. These valves respectively are preferably adjustable as to the pressure at which they operate and one of the valves is set at a lower pressure than the other. For example, one of these valves may be set to discharge at ten pounds pressure, while the other may be set to discharge at either twelve or fifteen pounds pressure. Through the pressure lines communicating with said relief valves as clearly shown in FIG. 6, the operation thereof readily can be understood.

In addition to the automatically operable relief valves 114 and 116, pressure line 98, for example, also has a T 118 mounted therein for leading off a branch line to a hand-operable safety valve 120 which readily can be operated at a convenient location if the operator observes from valve 112, for example, that the pressure exceeds that for which either of the relief valves 114 and 116 are set, thereby preventing damage to any of the equipment.

From the foregoing, it will be seen that the present invention comprises a highly automatically operable pressure-type cooking apparatus especially adapted for deep fat pressure frying of various types of foods. Suitable pressure responsive safety means are included in the pressure line system and circuitry to insure no danger occurring in the event of malfunctioning of the normal pressure relief mechanism. Appropriate timing means are included to provide for cyclical operation of the circulating means for the cooking oil to insure passage thereof through ample filtering means to remove small droppings of foodstuffs and food coverings separated from the larger pieces of food being processed, thereby to maintain the cooking oil in clean condition free from such particulate matter at all times. Novel baffle means are included in the lower portion of the cooking container to insure that the particulate droppings which migrate to the lower portion of the container will be directed to the discharge port and the tangential introduction of cleaned, filtered cooking oil discharged from the filter mechanism is introduced into the cooking container, preferably adjacent the bottom thereof so as to induce a swirling movement in the cooking oil, thereby sweeping the bottom of the container to insure agitation and movement of the gradually settled droppings for deflection thereof by the baffle referred to above toward the discharge port.

In addition, appropriate temperature indicating and regulating means are provided, as well as an additional timer for controlling the length of the cooking cycle automatically, said timer means not only assuring sealing of the interior of the cooking container from the atmosphere but also controlling the cooking period, at the end of which the pressure on the interior of the cooking container automatically is released to atmosphere prior to opening the container, thereby rendering such opening procedure safe and fool-proof.

While the invention has been described and illustrated in its several preferred embodiments, it should be understood that the invention is not to be limited to the precise details herein illustrated and described since the same may be carried out in other ways falling within the scope of the invention as claimed.

I claim:

1. A deep fat pressure fryer for food comprising in combination, a container substantially circular in cross-section and having a bottom and side walls to contain cooking oil or the like within which food is fried under pressure, heating means operable to heat oil within said container, a cover for the upper part of said container, means to clamp said cover in operative closed position relative to said container, a discharge port in the lower portion of said container through which the cooking oil is withdrawn from the container, an inlet port for cooking oil in the lower portion of said container adjacent the side thereof and directed tangentially to induce a circular flow of cooking oil when being introduced into the container, a baffle extending substantially radially in the lower portion of said container and extending upward a limited distance from adjacent the bottom of said container, said baffle also being positioned between said inlet and discharge ports so as to intercept cooking oil when moving circularly within said container from said inlet port and deflect the same toward the discharge port and thereby facilitate removal of small particles of food droppings from the container incident to discharging the cooking oil therefrom, and a conduit circuit between said inlet and discharge ports including a pump operable to induce flow of cooking oil within said container as aforesaid.

2. The fryer according to claim 1 in which the bottom of the container is substantially horizontal and the discharge port is adjacent the side wall of the container and spaced circumferentially from the inlet port, said inlet port being directed away from said discharge port and said ports being located relative to opposite sides of said baffle.

3. The fryer according to claim 1 in which the bottom of the container is substantially conical and the apex thereof extending downwardly, said discharge port being located substantially at the apex of said conical bottom and the inlet port being adjacent the upper portion of said conical bottom and located relative to opposite sides of said baffle.

4. The fryer according to claim 1 further including a filter in the conduit circuit between said discharge port and pump, and a one-way flow control valve in said conduit circuit between said pump and inlet port arranged to prevent back-flow from said container.

5. The fryer according to claim 1 in which the heating means is an electric resistance type mounted directly within the interior thereof adjacent the bottom of said container.

6. The fryer according to claim 1 further including an electric motor to drive the pump, circuit means to connect said motor to a source of current, a timer operable within said circuit means adjustably to operate said motor and pump cyclically for periods of predetermined lengths of time spaced for predetermined periods of time, said heater being of the electrical resistance type, a circuit therefor to connect the same to a source of current, and a timer within said latter circuit adjustably settable to energize said heater for a predetermined period of time and then interrupt the circuit incident to conditioning the contents of the container for opening to remove the cooked food.

7. The fryer according to claim 1 in which the heater is of the electric resistance type, a circuit therefor to connect the same to a source of current, a timer within said circuit adjustably settable to energize said heater for a predetermined period of time and then interrupt the circuit incident to conditioning the contents of the container for opening to remove the cooked food, and a venting valve communicating with and responsive to pressure within said container and operable to vent said container to atmosphere when a predetermined minimum pressure is reached within said container, said timer being interconnected to said valve and operable to close the same when said timer is placed in operation to initiate a cooking cycle.

8. The fryer according to claim 7 in which said venting valve is solenoid-actuated and said timer includes a switch connected in circuit with said solenoid, and said fryer also including a conduit between said venting valve and container and also including a relief safety valve connected in said conduit between said venting valve and container, said safety valve being adjustable to open automatically at a pressure selected in excess of that for which said venting valve is set to open.

9. The fryer according to claim 1 further including a pair of filters connected within said conduit between said discharge port and pump, said filters being in series and the one nearest said discharge port being coarser than the other, thereby distributing the separation of several ranges of sizes of extraneous food particle droppings between said filters to render the cooking oil substantially free of extraneous material when it reaches said pump.

10. The fryer according to claim 9 in which said filters have removable cartridges and said fryer further including a manually operable valve within said conduit between said discharge port and coarser filter, whereby said valve may be closed to permit said pump to operate to drain said filters of cooking oil prior to removal of the cartridges thereof for cleaning or replacement.

References Cited by the Examiner

UNITED STATES PATENTS

| | | | |
|---|---|---|---|
| 1,234,131 | 7/1917 | Cleveland | 99—404 |
| 1,417,516 | 5/1922 | Green | 210—512 |
| 2,053,568 | 9/1936 | Levin | 99—408 |
| 2,243,661 | 5/1941 | Tota | 99—408 X |
| 2,914,063 | 11/1959 | Wagner | 126—381 |
| 3,020,950 | 2/1962 | Schraivogel | 210—304 X |
| 3,107,601 | 10/1963 | Longmire | 99—408 X |
| 3,159,095 | 12/1964 | Wagner | 99—408 |

WALTER A. SCHEEL, *Primary Examiner.*

BILLY J. WILHITE, *Examiner.*